(12) United States Patent
Nishiyama et al.

(10) Patent No.: US 10,539,668 B2
(45) Date of Patent: Jan. 21, 2020

(54) POSITIONING DEVICE, COMMUNICATION DEVICE, AND POSITIONING SYSTEM FOR REDUCTION OF POWER CONSUMPTION

(71) Applicant: SONY CORPORATION, Tokyo (JP)

(72) Inventors: Fumihiro Nishiyama, Saitama (JP); Fumitaka Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/076,978

(22) PCT Filed: Feb. 10, 2017

(86) PCT No.: PCT/JP2017/004847
§ 371 (c)(1),
(2) Date: Aug. 9, 2018

(87) PCT Pub. No.: WO2017/145789
PCT Pub. Date: Aug. 31, 2017

(65) Prior Publication Data
US 2019/0041507 A1 Feb. 7, 2019

(30) Foreign Application Priority Data
Feb. 26, 2016 (JP) ................................. 2016-035126

(51) Int. Cl.
*H04W 74/00* (2009.01)
*G01S 11/06* (2006.01)
(Continued)

(52) U.S. Cl.
CPC .............. *G01S 11/06* (2013.01); *G01S 11/12* (2013.01); *G01S 11/14* (2013.01)

(58) Field of Classification Search
CPC ............................... H04W 4/00; H04W 24/00
(Continued)

(56) References Cited

U.S. PATENT DOCUMENTS 3,943,634 A * 3/1976 Lindermann ........... B21B 38/10
33/657
4,208,125 A * 6/1980 Ling ....................... G01S 17/10
356/5.03
(Continued)

FOREIGN PATENT DOCUMENTS

CN         1841084 A    10/2006
CN       105745897 A     7/2016
(Continued)

OTHER PUBLICATIONS

International Search Report and Written Opinion of PCT Application No. PCT/JP2017/004847, dated Apr. 18, 2017, 15 pages of ISRWO.

*Primary Examiner* — William D Cumming
(74) *Attorney, Agent, or Firm* — Chip Law Group

(57) ABSTRACT

The present technology relates to a positioning device, a communication device, and a positioning system that are designed to consume lower amounts of power in a more reliable manner. In a case where the identification information included in a received radio signal is the identification information about the current search target, and the reception intensity of the radio signal exceeds a predetermined value, the positioning device transmits a distance measurement start instruction to the communication device, and carries out measurement of the distance to the communication device. Upon receiving the distance measurement start instruction from the positioning device, the communication device performs measurement of the distance to the positioning device. The present technology can be applied to a positioning system.

19 Claims, 14 Drawing Sheets

(51) Int. Cl.
*G01S 11/12* (2006.01)
*G01S 11/14* (2006.01)

(58) Field of Classification Search
USPC .............. 455/456.1, 41.2; 370/328, 338; 340/13.31, 573.4
See application file for complete search history.

(56) References Cited

U.S. PATENT DOCUMENTS

| | | | | |
|---|---|---|---|---|
| 4,545,661 A * | 10/1985 | Hamaguchi | G03B 17/52 | 396/176 |
| 4,619,681 A * | 10/1986 | Tetaz | G01L 1/241 | 65/29.18 |
| 4,626,905 A * | 12/1986 | Schmidt | F41H 5/266 | 348/164 |
| 4,676,653 A * | 6/1987 | Strohmeier | G01N 21/8483 | 356/416 |
| 4,951,074 A * | 8/1990 | Ueda | G02B 7/10 | 396/62 |
| 5,137,350 A * | 8/1992 | Misawa | G01S 17/48 | 250/201.4 |
| 5,247,327 A * | 9/1993 | Suzuka | G03B 17/38 | 396/109 |
| 6,611,233 B2 * | 8/2003 | Kimura | G01S 5/0072 | 342/357.34 |
| 7,266,615 B2 * | 9/2007 | Yoneya | G06F 16/51 | 709/237 |
| 7,299,063 B2 * | 11/2007 | Kurihara | H04W 64/00 | 455/513 |
| 7,583,644 B2 * | 9/2009 | Morioka | H04W 74/002 | 370/338 |
| 7,710,829 B2 | 5/2010 | Wei et al. | | |
| 8,126,035 B2 * | 2/2012 | Hashimoto | H04B 1/7163 | 375/219 |
| 8,229,465 B2 * | 7/2012 | Rekimoto | G01S 5/0018 | 455/456.1 |
| 8,314,619 B2 * | 11/2012 | Takiguchi | G01S 11/06 | 324/457 |
| 8,412,113 B2 * | 4/2013 | Kohno | H04L 1/0014 | 342/450 |
| 8,452,239 B2 * | 5/2013 | Kohno | H04L 1/0014 | 455/63.1 |
| 8,478,301 B2 * | 7/2013 | Kohno | H04L 1/0014 | 455/456.3 |
| 8,479,059 B2 * | 7/2013 | Kohno | H04L 1/0014 | 356/4.07 |
| 8,601,527 B2 * | 12/2013 | Akashika | G08C 17/02 | 725/133 |
| 8,700,058 B2 * | 4/2014 | Rekimoto | G01S 5/0018 | 455/456.1 |
| 8,903,421 B2 * | 12/2014 | Rekimoto | G01S 5/0018 | 455/456.1 |
| 9,423,250 B1 * | 8/2016 | Troy | G01C 25/005 | |
| 9,544,866 B2 * | 1/2017 | Rekimoto | G01S 5/0018 | |
| 9,609,480 B2 * | 3/2017 | Priyanto | H04B 7/0413 | |
| 10,044,914 B2 * | 8/2018 | Ito | H04N 5/225 | |
| 10,058,290 B1 * | 8/2018 | Proud | A61B 5/749 | |
| 10,218,429 B2 * | 2/2019 | Saito | H04B 7/155 | |
| 10,327,670 B2 * | 6/2019 | Etemad | A61B 5/05 | |
| 2002/0036264 A1 * | 3/2002 | Nakasuji | G01N 23/225 | 250/306 |
| 2002/0049389 A1 * | 4/2002 | Abreu | A61B 3/1241 | 600/558 |
| 2002/0091017 A1 * | 7/2002 | Kuesters | A63B 24/0021 | 473/353 |
| 2003/0220765 A1 * | 11/2003 | Overy | H04L 63/0492 | 702/158 |
| 2003/0232598 A1 * | 12/2003 | Aljadeff | G01S 5/06 | 455/41.2 |
| 2004/0068744 A1 * | 4/2004 | Claussen | H04N 5/4401 | 725/81 |
| 2004/0085209 A1 * | 5/2004 | Schmidt | G08B 13/1427 | 340/573.4 |
| 2004/0130463 A1 * | 7/2004 | Bloomquist | G08G 1/096716 | 340/907 |
| 2004/0203600 A1 * | 10/2004 | McCorkle | G01S 7/023 | 455/411 |
| 2004/0239337 A1 * | 12/2004 | Jean | G01N 22/00 | 324/638 |
| 2005/0022273 A1 * | 1/2005 | Maeki | G05D 1/0274 | 701/300 |
| 2005/0025092 A1 * | 2/2005 | Morioka | H04W 74/002 | 370/328 |
| 2005/0045821 A1 * | 3/2005 | Noji | G01N 23/225 | 250/311 |
| 2005/0046584 A1 * | 3/2005 | Breed | B60C 11/24 | 340/13.31 |
| 2006/0208169 A1 * | 9/2006 | Breed | B60N 2/002 | 250/221 |
| 2007/0053412 A1 * | 3/2007 | Hashimoto | H04B 1/7163 | 375/130 |
| 2009/0231958 A1 | 9/2009 | Wei et al. | | |
| 2012/0283555 A1 * | 11/2012 | Su | A61M 16/04 | 600/424 |
| 2015/0139213 A1 | 5/2015 | Abraham et al. | | |
| 2015/0272483 A1 * | 10/2015 | Etemad | A61B 5/05 | 600/409 |
| 2017/0206721 A1 * | 7/2017 | Koo | G07C 9/00015 | |
| 2018/0328777 A1 * | 11/2018 | Gurumohan | G01N 33/14 | |
| 2018/0356507 A1 * | 12/2018 | Ichinose | G01S 13/9303 | |
| 2019/0041507 A1 * | 2/2019 | Nishiyama | G01S 11/06 | |
| 2019/0154439 A1 * | 5/2019 | Binder | G01B 11/26 | |
| 2019/0182415 A1 * | 6/2019 | Sivan | G06F 3/012 | |

FOREIGN PATENT DOCUMENTS

| | | |
|---|---|---|
| JP | 2002-340555 A | 11/2002 |
| JP | 2006-313111 A | 11/2006 |
| JP | 2009-253494 A | 10/2009 |
| JP | 2011-188413 A | 9/2011 |
| JP | 2013-088286 A | 5/2013 |
| JP | 2013-88286 A | 5/2013 |
| JP | 2013-167559 A | 8/2013 |
| JP | 5792412 B1 | 10/2015 |
| KR | 10-2016-0088366 A | 7/2016 |
| WO | 2006/102844 A1 | 10/2006 |
| WO | 2015/073969 A1 | 5/2015 |

* cited by examiner

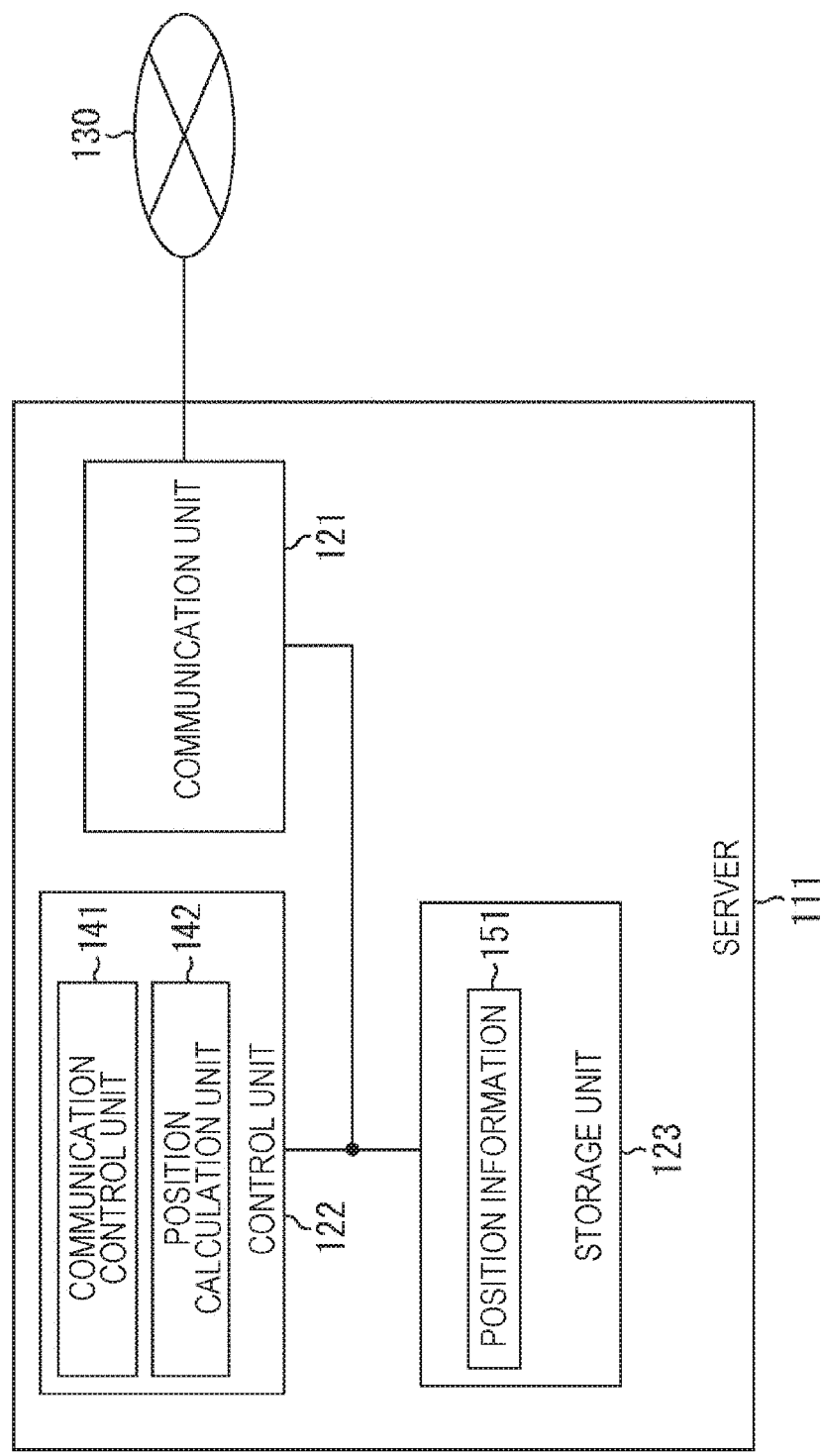

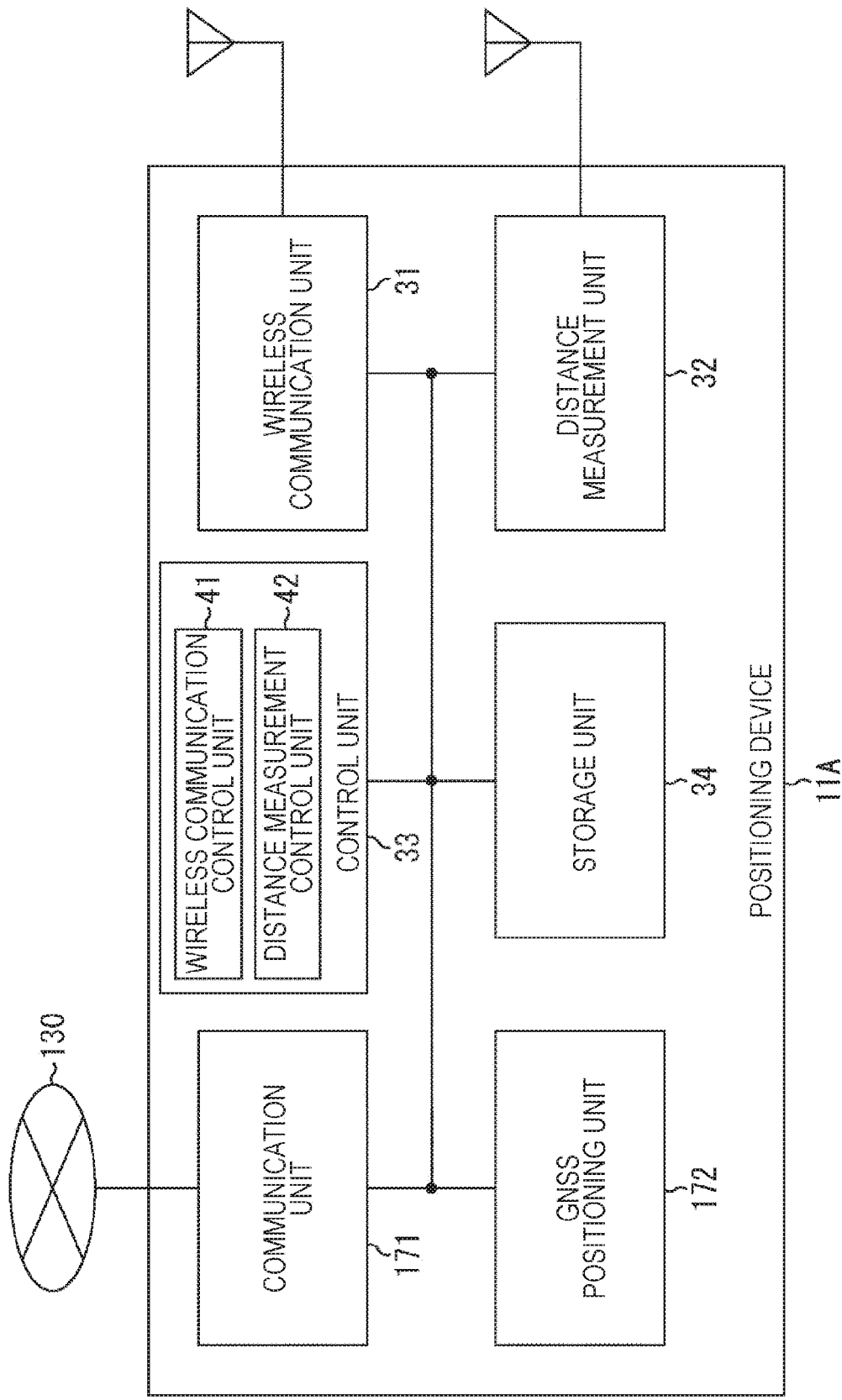

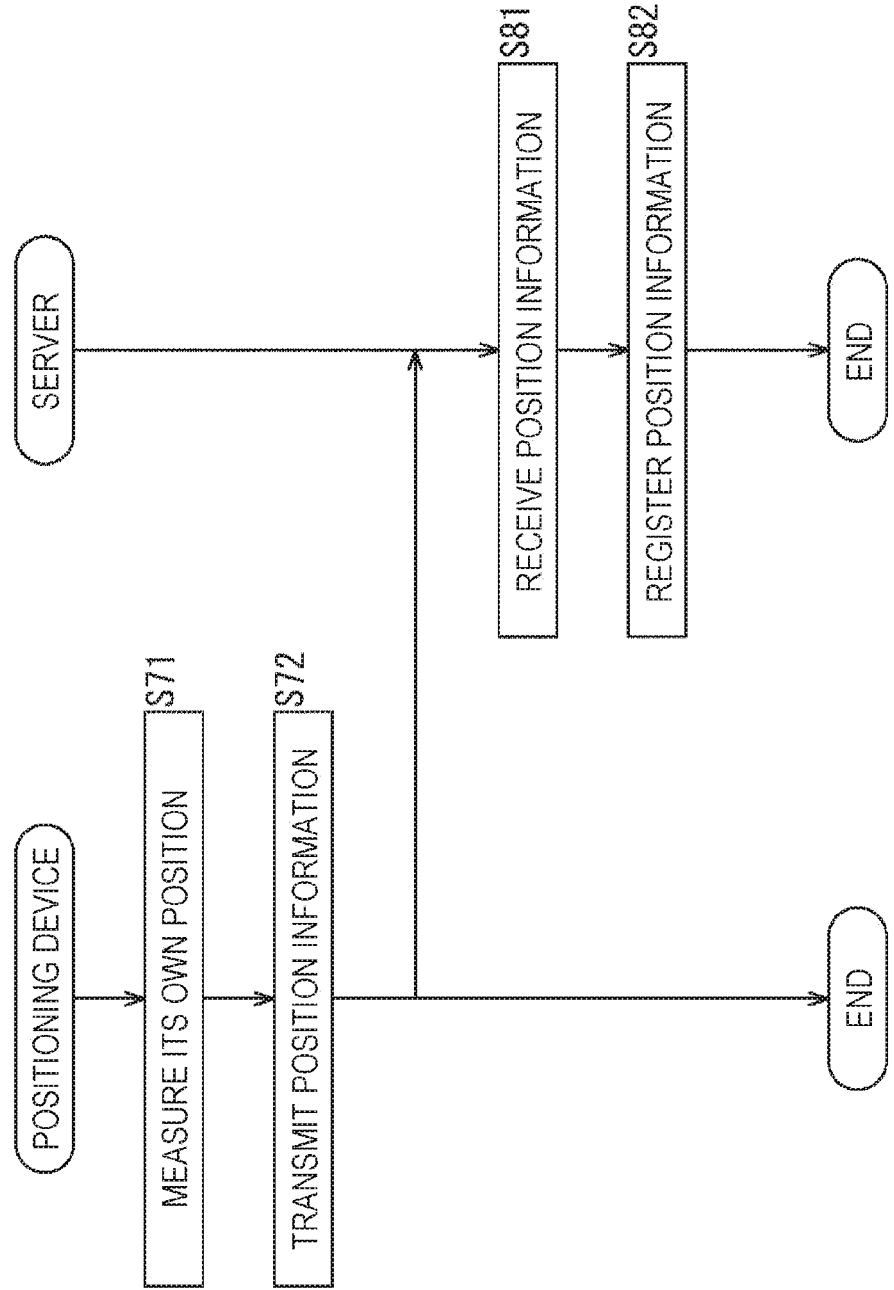

POSITIONING DEVICE, COMMUNICATION DEVICE, AND POSITIONING SYSTEM FOR REDUCTION OF POWER CONSUMPTION

CROSS REFERENCE TO RELATED APPLICATIONS

This application is a U.S. National Phase of International Patent Application No. PCT/JP2017/004847 filed on Feb. 10, 2017, which claims priority benefit of Japanese Patent Application No. JP 2016-035126 filed in the Japan Patent Office on Feb. 26, 2016. Each of the above-referenced applications is hereby incorporated herein by reference in its entirety.

TECHNICAL FIELD

The present technology relates to a positioning device, a communication device, and a positioning system, and more particularly, to a positioning device, a communication device, and a positioning system that are designed to consume lower amounts of power.

BACKGROUND ART

There are conventionally known positioning methods using receiving electric field intensities of radio waves, such as Wi-Fi (registered trademark) and BLUETOOTH® Low Energy (BLE). By such positioning methods, it is difficult to accurately measure positions in some radio wave propagation environments.

Therefore, ultrawideband (UWB) communication, and positioning methods using light or sound waves have been suggested, to realize more accurate positioning on the order of several centimeters. For example, Patent Document 1 discloses a positioning system that uses light emission from a light emitter.

CITATION LIST

Patent Document

Patent Document 1: Japanese Patent Application Laid-Open No. 2006-313111

SUMMARY OF THE INVENTION

Problems to be Solved by the Invention

In the system disclosed in Patent Document 1, an identification information transmission device that is the current positioning target causes a positioning light emitter to emit light at regular intervals. In other words, even in a case where the identification information transmission device is not the current positioning target, it is necessary to cause the light emitter to emit light at regular intervals, resulting in a waste of electric power.

The present technology has been developed in view of those circumstances, and is to reduce power consumption in a more reliable manner.

Solutions to Problems

A positioning device of the present technology includes: a communication control unit that controls a communication unit that communicates with a communication device that transmits a radio signal including identification information; and a distance measurement control unit that controls a distance measurement unit that carries out measurement of the distance to the communication device. In a case where the identification information included in the radio signal received by the communication unit is the identification information about the current search target, and the reception intensity of the radio signal exceeds a predetermined value, the communication control unit causes the communication unit to transmit a distance measurement start instruction to the communication device, and the distance measurement control unit causes the distance measurement unit to carry out measurement of the distance to the communication device.

A communication device of the present technology includes: a communication control unit that controls a communication unit that transmits a radio signal to a positioning device, the radio signal including identification information; and a distance measurement control unit that controls a distance measurement unit that carries out measurement of the distance to the positioning device. In a case where the communication control unit has determined that the communication unit has received a distance measurement start instruction from the positioning device, the distance measurement control unit causes the distance measurement unit to carry out measurement of the distance to the positioning device.

A positioning system of the present technology includes: a positioning device that includes: a first communication control unit that controls a first communication unit that communicates with a communication device that transmits a radio signal including identification information; and a first distance measurement control unit that controls a first distance measurement unit that carries out measurement of the distance to the communication device; and a communication device that includes: a second communication control unit that controls a second communication unit that transmits a radio signal to the positioning device, the radio signal including the identification information; and a second distance measurement control unit that controls a second distance measurement unit that carries out measurement of the distance to the positioning device. In a case where the identification information included in the radio signal received by the first communication unit is the identification information about the current search target, and the reception intensity of the radio signal exceeds a predetermined value, the first communication control unit causes the first communication unit to transmit a distance measurement start instruction to the communication device, and the first distance measurement control unit causes the first distance measurement unit to carry out measurement of the distance to the communication device. In a case where the second communication control unit has determined that the second communication unit has received a distance measurement start instruction from the positioning device, the second distance measurement control unit causes the second distance measurement unit to carry out measurement of the distance to the positioning device.

According to the present technology, in a case where the identification information included in a received radio signal is the identification information about the current search target, and the reception intensity of the radio signal exceeds a predetermined value, a distance measurement start instruction is transmitted to the communication device, and measurement of the distance to the communication device is carried out. In a case where a distance measurement start instruction is received from the positioning device, measurement of the distance to the positioning device is carried out.

EFFECTS OF THE INVENTION

According to the present technology, power consumption can be reduced in a more reliable manner.

BRIEF DESCRIPTION OF DRAWINGS

FIG. 12 is a block diagram showing an example configuration of a server.

FIG. 13 is a block diagram showing yet another example configuration of a positioning device.

FIG. 14 is a flowchart for explaining a position information registration process.

MODE FOR CARRYING OUT THE INVENTION

The following is a description of embodiments of the present technology, with reference to the drawings.

<Example Configuration of a Positioning System of the Present Technology>

Figure 1:
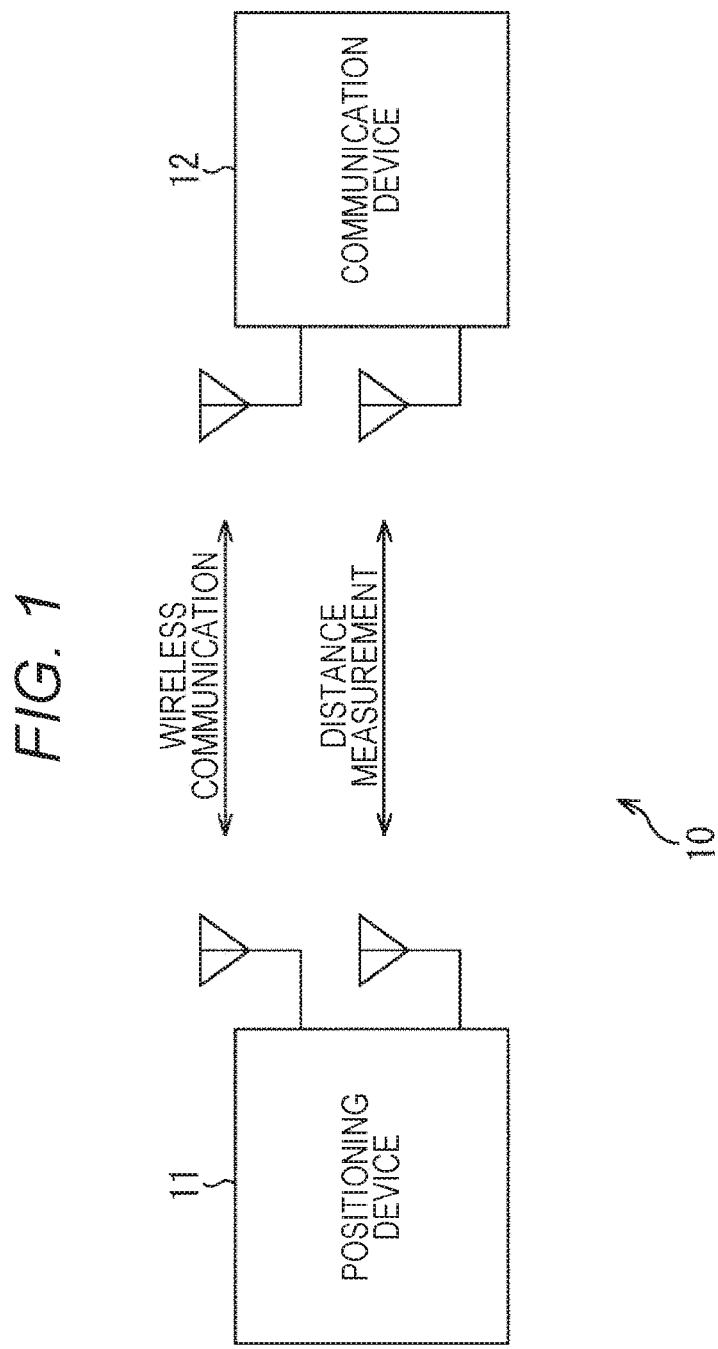
FIG. 1 is a block diagram showing an example configuration of a positioning system of the present technology.

FIG. 1 shows an example configuration of a positioning system of the present technology.

A positioning system 10 includes a positioning device 11 and a communication device 12.

In the positioning system 10, the positioning device 11 serving as a master device measures the distance to the communication device 12 as a slave device. Specifically, the positioning device 11 measures the distance to the communication device 12 while being able to perform wireless communication with the communication device 12, which is the current search target (the current distance measurement target). In other words, when the positioning device 11 is unable to perform wireless communication with the communication device 12, the distance to the communication device 12 is not measured.

In wireless communication between the positioning device 11 and the communication device 12, a bidirectional wireless communication scheme using Wi-Fi (registered trademark), BLE (BLUETOOTH® Low Energy), or the like can be adopted, for example.

Furthermore, in measuring the distance between the positioning device 11 and the communication device 12, ultra-wideband (UWB) communication, or a method that uses light or sound waves can be adopted.

UWB communication is a method of performing wireless communication by carrying information on an extremely weak impulse train, and, according to this method, distance measurement is carried out with a high temporal resolution by an ultra-fine pulse.

Where a method that uses light is adopted, an imaging means is provided in the positioning device 11, and a light emitter is provided in the communication device 12. The positioning device 11 can capture an image of the communication device 12, and carry out distance measurement in accordance with the coordinates of the light emitter in the captured image.

Where a method that uses sound waves is adopted, the positioning device 11 and the communication device 12 are synchronized in time. The communication device 12 outputs sound waves at a predetermined time, the positioning device 11 receives the sound waves at a time synchronized with the output of the sound waves from the communication device 12, and the sound wave propagation time is calculated. In this manner, distance measurement can be carried out.

Figure 2:
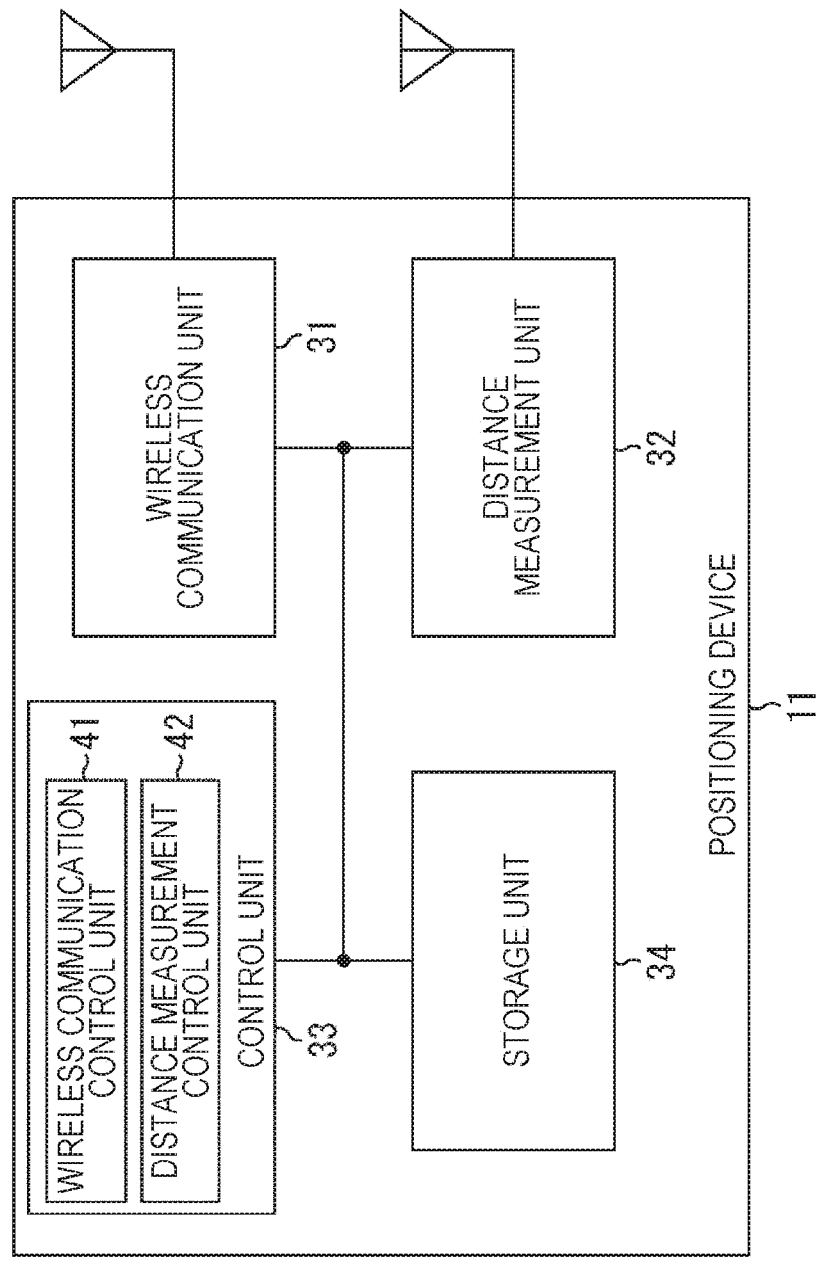
FIG. 2 is a block diagram showing an example configuration of a positioning device.

FIG. 2 shows an example configuration of the positioning device 11.

The positioning device 11 includes a wireless communication unit 31, a distance measurement unit 32, a control unit 33, and a storage unit 34.

Under the control of the control unit 33, the wireless communication unit 31 performs wireless communication with the communication device 12 by one of the above mentioned wireless communication methods.

Under the control of the control unit 33, the distance measurement unit 32 measures the distance to the communication device 12 by the above described distance measurement method.

The control unit 33 is formed with a central processing unit (CPU), and controls operations of the wireless communication unit 31 and the distance measurement unit 32.

In addition to the control program to be executed by the control unit 33, the storage unit 34 stores identification information (ID) for uniquely identifying its own device.

The control unit 33 also achieves the configurations of a wireless communication control unit 41 and a distance measurement control unit 42 by executing the control program stored in the storage unit 34.

The wireless communication control unit 41 realizes wireless communication with the communication device 12 by controlling the wireless communication unit 31.

The distance measurement control unit 42 realizes the measurement of the distance to the communication device 12 by controlling the distance measurement unit 32.

Figure 3:
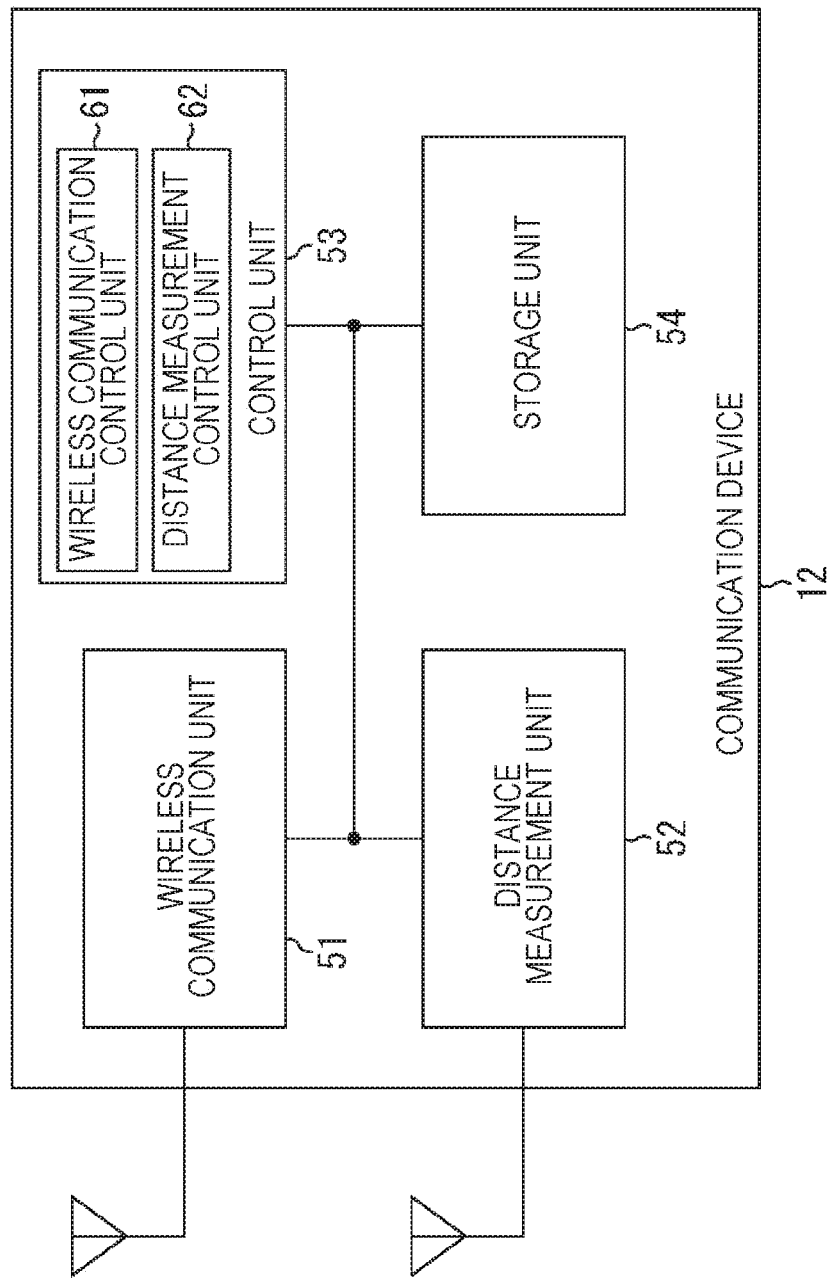
FIG. 3 is a block diagram showing an example configuration of a communication device.

FIG. 3 shows an example configuration of the communication device 12.

The communication device 12 includes a wireless communication unit 51, a distance measurement unit 52, a control unit 53, and a storage unit 54.

Under the control of the control unit 53, the wireless communication unit 51 performs wireless communication with the positioning device 11 by one of the above mentioned wireless communication methods.

Under the control of the control unit 53, the distance measurement unit 52 measures the distance to the positioning device 11 by the above described distance measurement method.

The control unit 53 is formed with a CPU, and controls operations of the wireless communication unit 51 and the distance measurement unit 52.

In addition to the control program to be executed by the control unit 53, the storage unit 54 stores identification information (ID) for uniquely identifying its own device.

The control unit 53 also achieves the configurations of a wireless communication control unit 61 and a distance measurement control unit 62 by executing the control program stored in the storage unit 54.

The wireless communication control unit 61 realizes wireless communication with the positioning device 11 by controlling the wireless communication unit 51.

The distance measurement control unit 62 realizes the measurement of the distance to the positioning device 11 by controlling the distance measurement unit 52.

With the above configuration, distance measurement is carried out between the positioning device 11 and the communication device 12.

<First Embodiment>

Figure 4:
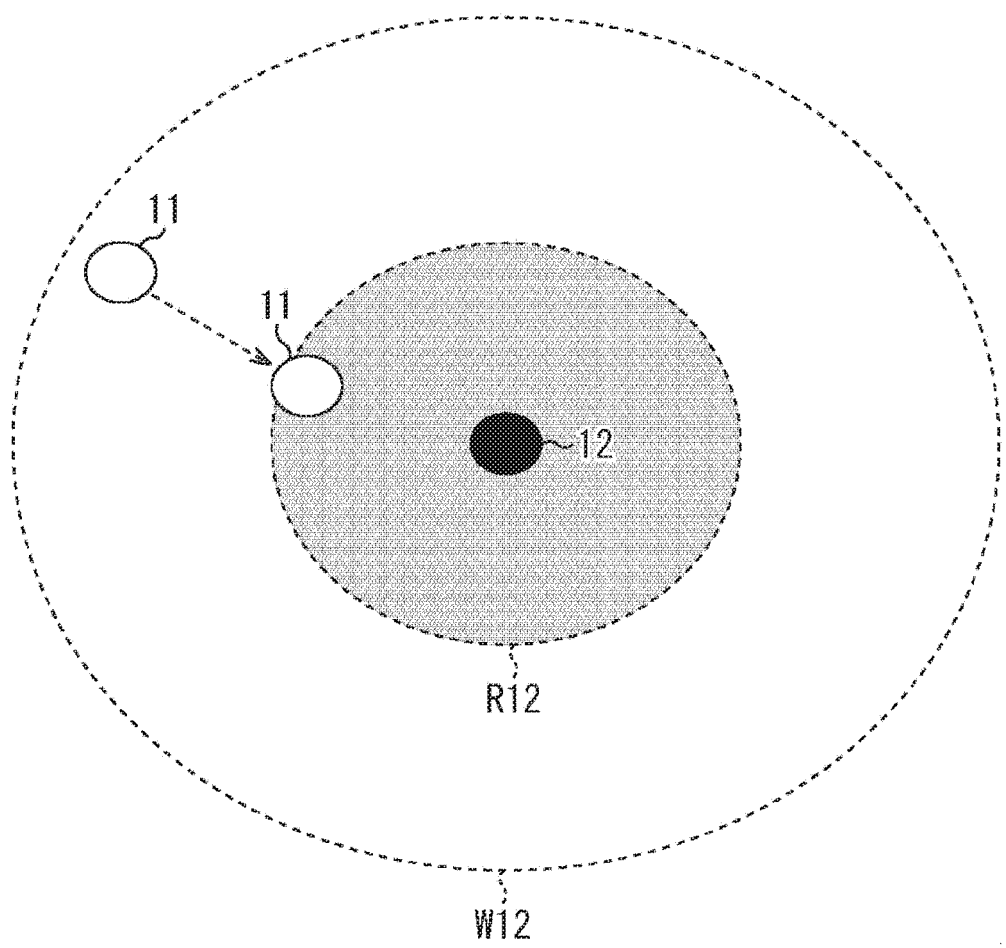
FIG. 4 is a diagram for explaining distance measurement according to a first embodiment.

FIG. 4 is a diagram for explaining distance measurement according to a first embodiment.

In FIG. 4, the positioning device 11 as a master device is designed as a portable telephone device owned by a user, for example, and the communication device 12 as a slave device is designed as an IC tag or the like to be attached to a small item (such as a key or a wallet) owned by the user, for example. In the example shown in FIG. 4, it is assumed that the user searches for a key or a wallet in a room while holding a portable telephone device in the room.

In FIG. 4, a wireless communication coverage W12 based on the communication device 12 is wider than its distance measurable range R12.

For example, when the positioning device 11 (the user) approaches the communication device 12 (a key) and enters the wireless communication coverage W12, the positioning device 11 enters a state in which the positioning device 11 is able to perform wireless communication with the communication device 12. When the positioning device 11 further approaches the communication device 12 and enters the distance measurable range R12, the positioning device 11 measures the distance to the communication device 12.

Distance measurement processes to be performed by the positioning device 11 and the communication device 12 are now described in detail.

Figure 5:
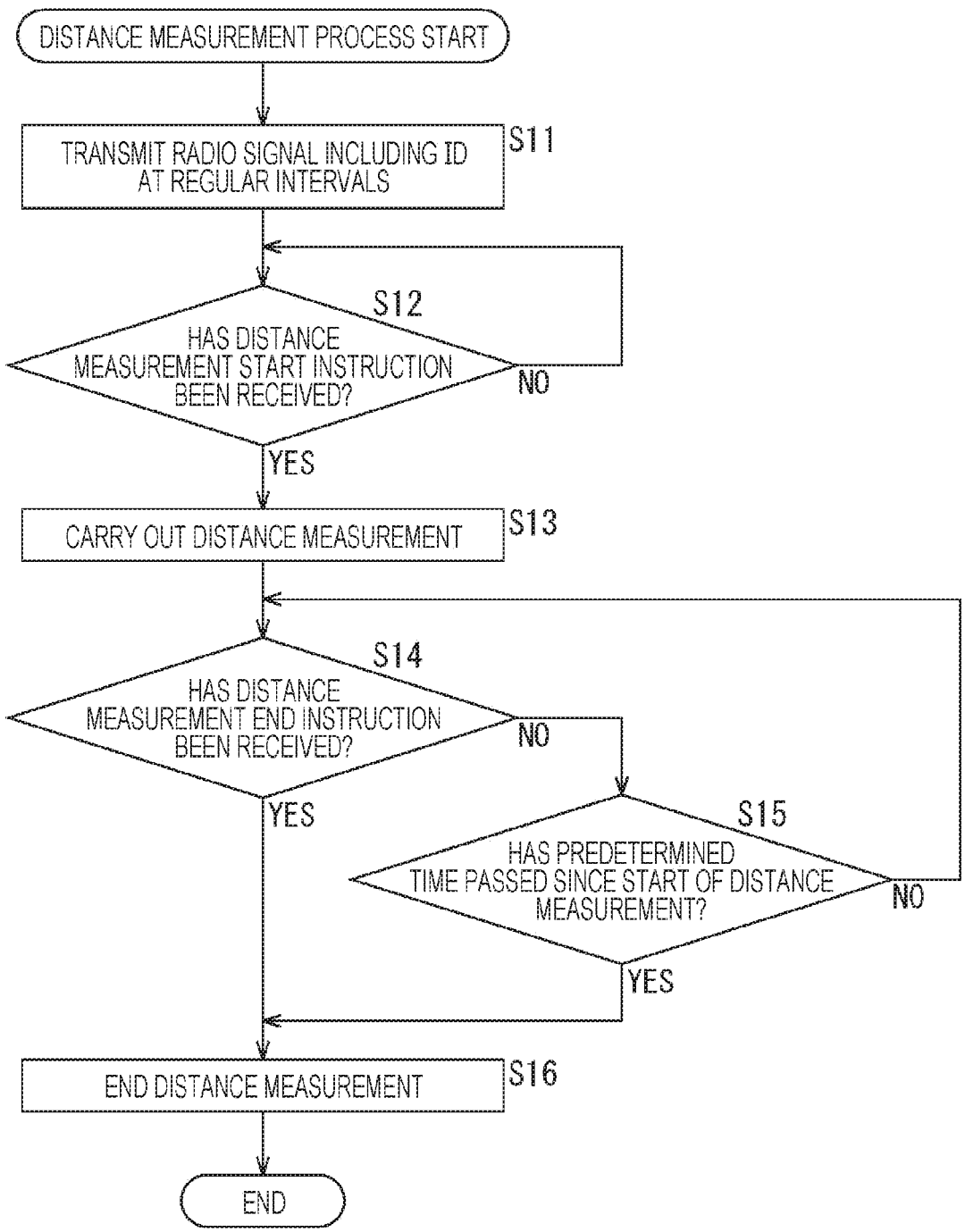
FIG. 5 is a flowchart for explaining a distance measurement process to be performed by the communication device.

Referring first to the flowchart in FIG. 5, a distance measurement process to be performed by the communication device 12 is described.

In step S11, the wireless communication control unit 61 of the communication device 12 causes the wireless communication unit 51 to transmit a radio signal including an ID for identifying its own device at regular intervals.

In a case where this radio signal is received by the positioning device 11, and the positioning device 11 determines that the ID included in the radio signal is the ID of the current search target and the reception intensity of the radio signal exceeds a predetermined value, a distance measurement start instruction is transmitted from the positioning device 11. Here, the predetermined value regarding the reception intensity is a reception intensity indicating the range in which the positioning device 11 can measure the distance to the communication device 12.

It should be noted that, at this stage, the distance measurement unit 52 of the communication device 12 is not in an activated state.

In step S12, the wireless communication control unit 61 determines whether or not the wireless communication unit 51 has received a distance measurement start instruction from the positioning device 11.

Step S12 is repeated until it is determined that a distance measurement start instruction has been received.

Then, if it is determined that a distance measurement start instruction has been received, the process moves on to step S13.

In step S13, the distance measurement control unit 62 activates the distance measurement unit 52, and causes the distance measurement unit 52 to measure the distance to the positioning device 11.

In a case where the distance measurement has been carried out between the positioning device 11 and the communication device 12, and the positioning device 11 determines that the distance measurement is completed, a distance measurement end instruction is transmitted from the positioning device 11.

In step S14, the wireless communication control unit 61 determines whether or not the wireless communication unit 51 has received a distance measurement end instruction from the positioning device 11.

If it is determined in step S14 that any distance measurement end instruction has not been received, the process moves on to step S15.

In step S15, the distance measurement control unit 62 determines whether or not a predetermined time has passed since the distance measurement was started.

If it is determined in step S15 that the predetermined time has not passed since the distance measurement was started, the process returns to step S14, and steps S14 and S15 are repeated.

Then, if it is determined in step S14 that a distance measurement end instruction has been received, or if it is determined in step S15 that the predetermined time has passed since the distance measurement was started, the process moves on to step S16.

In step S16, the distance measurement control unit 62 causes the distance measurement unit 52 to end the measurement of the distance to the positioning device 11, and stops the distance measurement unit 52.

Figure 6:
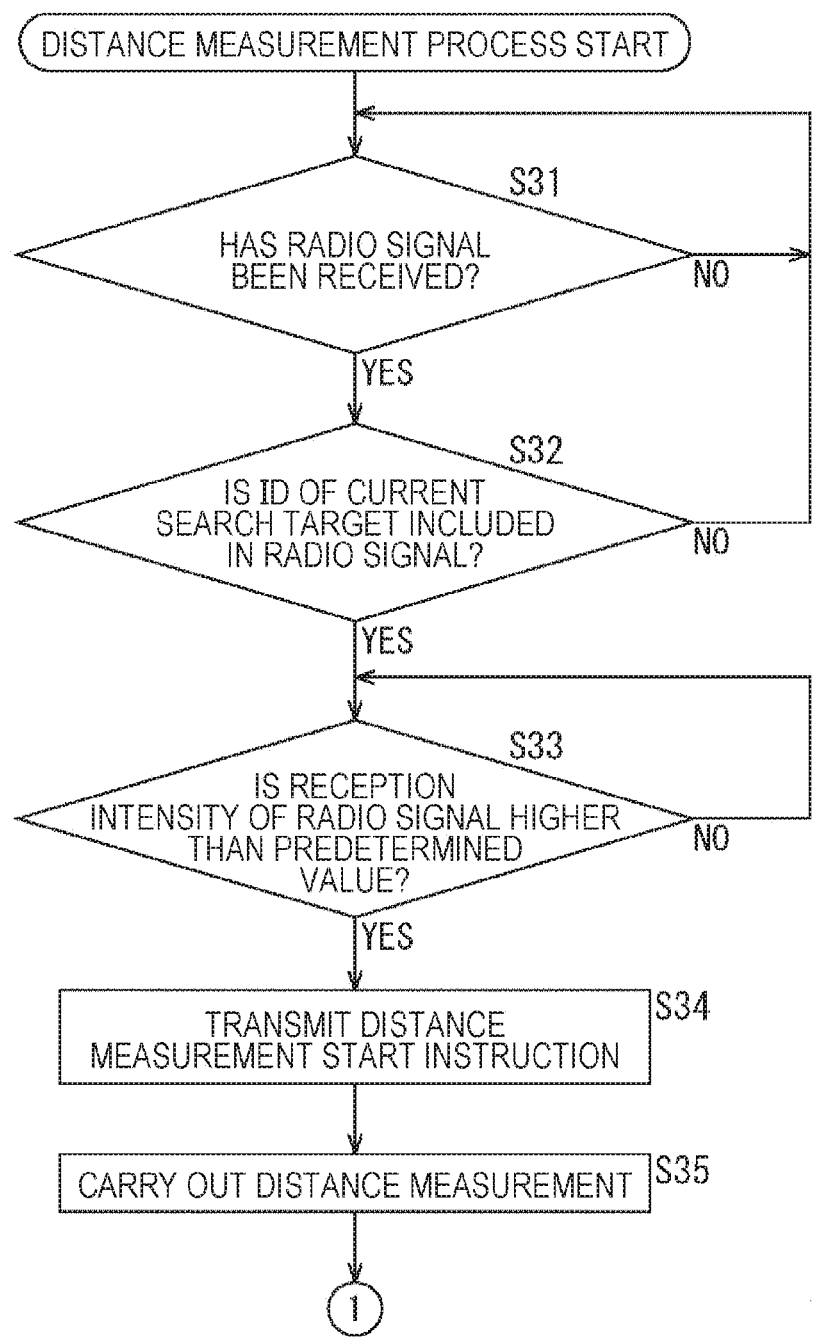
FIG. 6 is a flowchart for explaining a distance measurement process to be performed by the positioning device.
Figure 7:
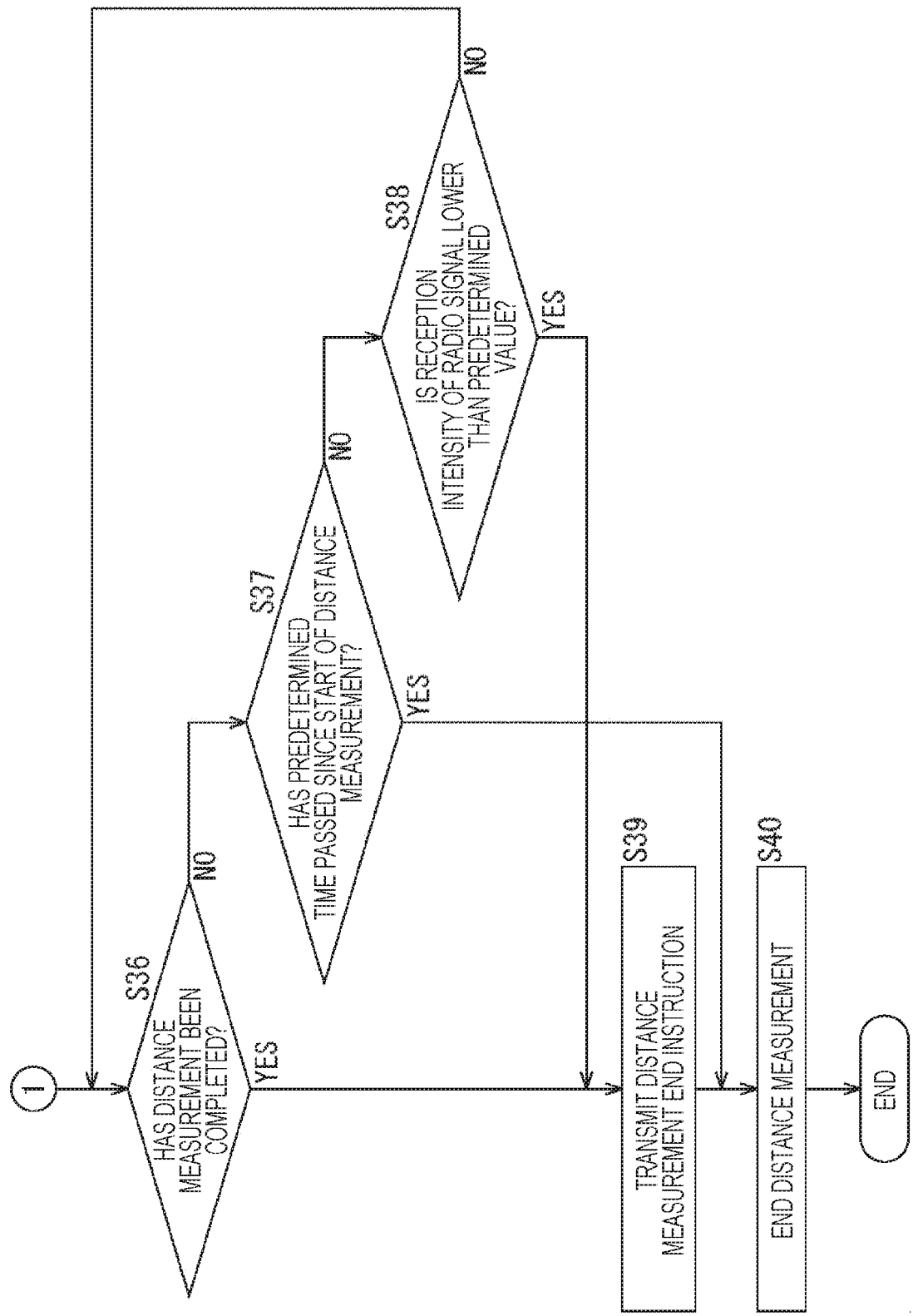
FIG. 7 is a flowchart for explaining the distance measurement process to be performed by the positioning device.

Next, a distance measurement process to be performed by the positioning device 11 is described, with reference to the flowcharts shown in FIGS. 6 and 7. The process shown in FIG. 6 starts in a situation where the positioning device 11, which is a master device, has acquired the ID of the communication device 12 as the current search target in advance, and the wireless communication control unit 41 has activated the wireless communication unit 31 by designating the ID.

It should be noted that, at this stage, the distance measurement unit 32 of the positioning device 11 is not in an activated state.

In step S31, the wireless communication control unit 41 of the positioning device 11 determines whether or not the wireless communication unit 31 has received a radio signal.

Until it is determined that a radio signal has been received, step S31 is repeated.

Then, if it is determined that a radio signal has been received, the process moves on to step S32.

In step S32, the wireless communication control unit 41 determines whether or not the ID of the current search target is included in the radio signal received by the wireless communication unit 31.

If it is determined in step S32 that the ID of the current search target is not included in the radio signal, the process returns to step S31, and steps S31 and S32 are repeated.

Then, if it is determined in step S32 that the ID of the current search target is included in the radio signal, the process moves on to step S33.

In step S33, the wireless communication control unit 41 determines whether or not the reception intensity of the radio signal received by the wireless communication unit 31 exceeds a predetermined value. As described above, the predetermined value is a reception intensity indicating the range in which the positioning device 11 can measure the distance to the communication device 12. That is, a check is made to determine whether or not the positioning device 11 is within the distance measurable range R12 of the communication device 12. It should be noted that the predetermined value may be determined in advance, or may be determined by the positioning device 11 through learning.

Step S33 is repeated until it is determined that the reception intensity of the radio signal exceeds the predetermined value, or until the positioning device 11 enters the distance measurable range R12 of the communication device 12.

Then, if it is determined that the reception intensity of the radio signal exceeds the predetermined value, or when the positioning device 11 enters the distance measurable range R12 of the communication device 12, the process moves on to step S34.

In step S34, the wireless communication control unit 41 causes the wireless communication unit 31 to transmit a distance measurement start instruction to the communication device 12. Upon receiving the distance measurement start instruction, the communication device 12 starts measuring the distance to the positioning device 11.

Furthermore, in step S35, the distance measurement control unit 42 activates the distance measurement unit 32, and causes the distance measurement unit 32 to measure the distance to the communication device 12.

Referring now to the flowchart in FIG. 7, the distance measurement control unit 42 determines in step S36 whether or not the distance measurement has been completed.

If it is determined in step S36 that the distance measurement has not been completed, the process moves on to step S37.

In step S37, the distance measurement control unit 42 determines whether or not a predetermined time has passed since the distance measurement was started.

If it is determined in step S37 that the predetermined time has not passed since the start of the distance measurement, the process moves on to step S38.

In step S38, the wireless communication control unit 41 determines whether or not the reception intensity of the radio signal received from the communication device 12 as the current search target is lower than the predetermined value. That is, a check is made to determine whether or not the positioning device 11 has moved out of the distance measurable range R12 of the communication device 12.

If it is determined in step S38 that the reception intensity of the radio signal is not lower than the predetermined value, or if it is determined that the positioning device 11 has not moved out of the distance measurable range R12 of the communication device 12, the process returns to step S36, and step S36 through S38 are repeated.

On the other hand, if it is determined in step S36 that the distance measurement has been completed, or if it is determined in step S38 that the reception intensity of the radio signal has become lower than the predetermined value or the positioning device 11 has moved out of the distance measurable range R12 of the communication device 12, the process moves on to step S39.

In step S39, the wireless communication control unit 41 causes the wireless communication unit 31 to transmit a distance measurement end instruction to the communication device 12. Upon receiving the distance measurement end instruction, the communication device 12 ends the measurement of the distance to the positioning device 11.

Then, in step S40, the distance measurement control unit 42 causes the distance measurement unit 32 to end the measurement of the distance to the communication device 12, and stops the distance measurement unit 32.

If it is determined in step S37 that the predetermined time has passed since the start of the distance measurement, the process also moves on to step S40, and the measurement of the distance to the communication device 12 is ended.

In the above described process, distance measurement is carried out only in a case where the communication device 12 is the current search target and the positioning device 11 is within the distance measurable range R12 of the communication device 12. In other words, distance measurement is not carried out in a case where the communication device 12 is not the current search target, or where the positioning device 11 is not within the distance measurable range R12 of the communication device 12. Therefore, the distance measurement unit in each of the positioning device 11 and the communication device 12 is not activated in a case where there is no need for distance measurement. Accordingly, it is possible to more reliably reduce power consumption without any waste of electric power.

In the system that is disclosed in Patent Document 1 and carries out distance measurement by a method that uses light, there is a possibility that a plurality of identification information transmission devices enter the imaging range of the imaging device that images the light emitter, and there is a need to identify the identification information transmission device that is the current positioning target.

In the above described process, on the other hand, even if there are a plurality of communication devices 12, it is possible to measure only the distance to the communication device 12 that is the current search target. That is, in the system disclosed in Patent Document 1, only the light emitter of the communication device 12 as the current search target emits light. Therefore, there is no need to identify the device that is the current positioning target, and the processing load on the positioning device 11 can be reduced.

Also, in the above described configuration, the respective distance measurement control units 42 and 62 of the positioning device 11 and the communication device 12 may adjust the width of the distance measurable range R12. With this arrangement, it is possible to reduce signal outputs (radio wave transmission outputs, emission intensities, or sound wave outputs) of the respective distance measurement units 32 and 52 of the positioning device 11 and the communication device 12, and to reduce the power consumption required for distance measurement.

Further, in the above described configuration, the respective distance measurement control units 42 and 62 of the positioning device 11 and the communication device 12 may control the timings of signal outputs from the respective distance measurement units 32 and 52 of the positioning device 11 and the communication device 12. With this arrangement, it is possible to avoid interference between signals for distance measurement, so there is no need to provide a circuit for eliminating the influence of interference. As a result, the configuration of the transmission/reception circuits of the distance measurement units 32 and 52 can be simplified.

It should be noted that, in the above embodiment, the wireless communication coverage W12 is wider than the distance measurable range R12. However, the wireless communication coverage W12 may be narrower than the distance measurable range R12, or the wireless communication coverage W12 and the distance measurable range R12 may have substantially the same width.

<Second Embodiment>

Figure 8:
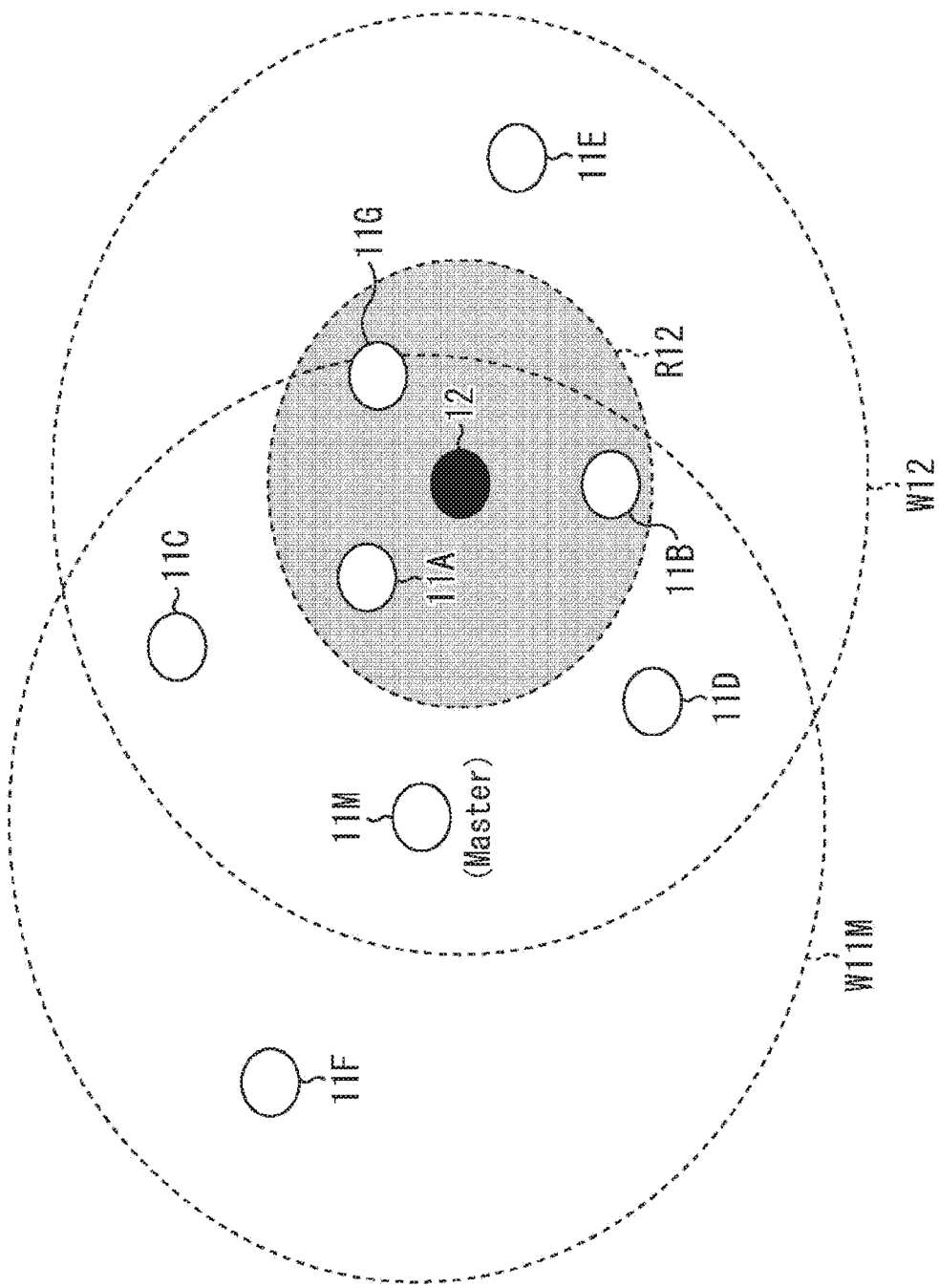
FIG. 8 is a diagram for explaining distance measurement according to a second embodiment.

FIG. 8 is a diagram for explaining distance measurement according to a second embodiment.

In FIG. 8, a positioning device 11M as a master device (Master) is designed as a portable telephone device owned by a user, for example, and positioning devices 11A through 11G that are other master devices are designed as IC tags or the like that can be attached to lighting devices or the like in users' residences, for example. A communication device 12 that is a slave device is designed as an IC tag or the like to be attached to a small item (such as a key or a wallet) owned by the user, for example. In the example shown in FIG. 8, it is also assumed that the user searches for a key, a wallet, or the like in a room while holding a portable telephone device in the room.

In FIG. 8, a wireless communication coverage W12 based on the communication device 12 is wider than its distance measurable range R12, as in FIG. 4. Further, it is assumed that the positioning devices 11A through 11D, 11F, and 11G are arranged within the wireless communication coverage W11M of the positioning device 11M.

For example, when the positioning device 11M (the user) instructs the positioning devices 11A through 11D, 11F, and 11G within the wireless communication coverage W11M to search for the communication device 12, the positioning devices 11A, 11B, and 11G located within the distance measurable range R12 of the communication device 12 each measure the distance to the communication device 12. The positioning devices 11A, 11B, and 11G notify the positioning device 11M of the results of the distance measurement, and, in accordance with the reported measurement results, the positioning device 11M calculates the position of the communication device 12.

Figure 9:
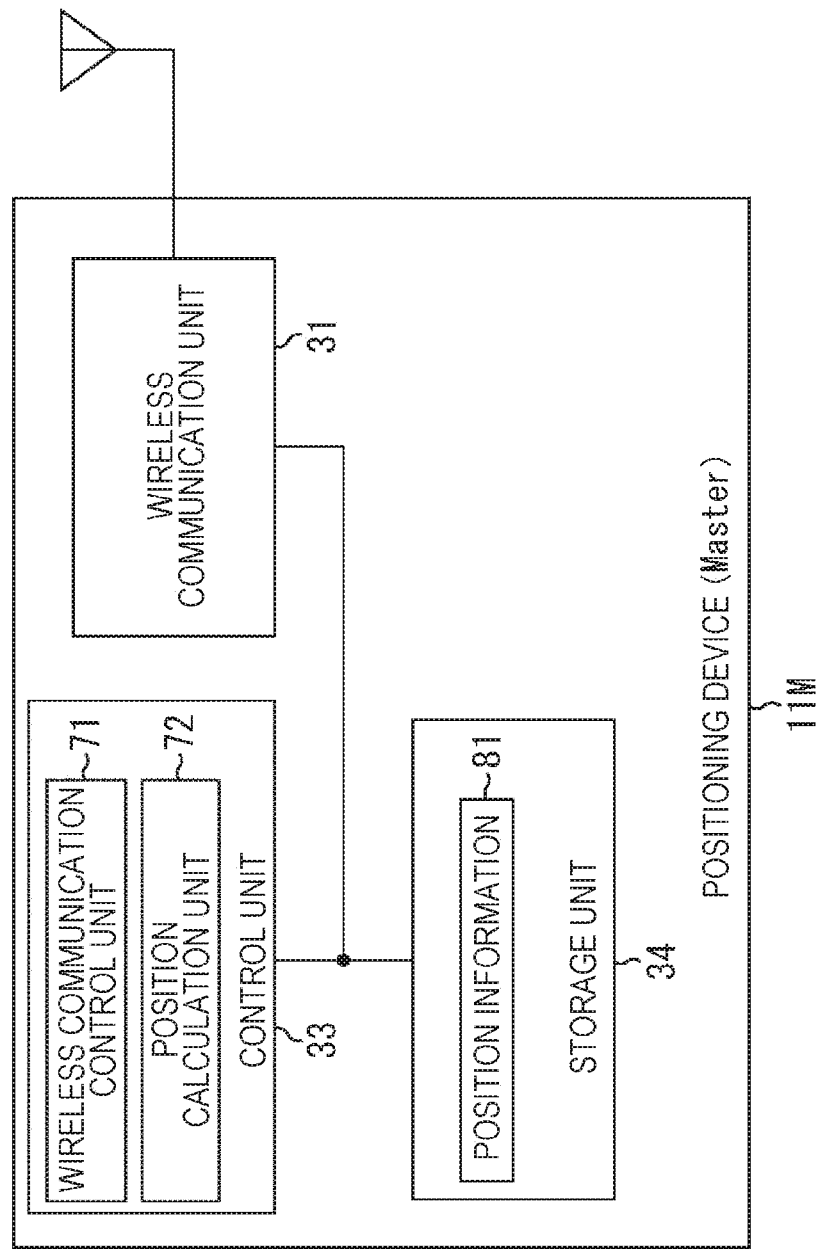
FIG. 9 is a block diagram showing another example configuration of a positioning device.

Referring now to FIG. 9, an example configuration of the positioning device 11M is described. It should be noted that, in FIG. 9, components similar to those in the configuration described above with reference to FIG. 2 are denoted by the same reference numerals as those used in FIG. 2, and explanation of them is not made herein. Further, the configurations of the positioning devices 11A through 11G are the same as the configuration described above with reference to FIG. 2.

The positioning device 11M includes a wireless communication unit 31, a control unit 33, and a storage unit 34. That is, the positioning device 11M differs from the positioning device 11 shown in FIG. 2 in not including a distance measurement unit 32.

The control unit 33 achieves the configurations of a wireless communication control unit 71 and a position calculation unit 72 by executing a control program stored in the storage unit 34.

The wireless communication control unit 71 realizes wireless communication with the communication device 12 by controlling the wireless communication unit 31.

In accordance with measurement results supplied from the positioning devices capable of wirelessly communicating with the positioning device 11M and measuring the distance to the communication device 12 among the positioning devices 11A through 11G, the position calculation unit 72 calculates the position of the communication device 12.

The storage unit 34 stores position information 81. The position information 81 is information indicating the positions in which the respective positioning devices 11A through 11G are disposed. That is, the position calculation unit 72 calculates the position of the communication device 12, in accordance with position information about the positioning devices that have measured the distance to the communication device 12, and measurement results supplied from these positioning devices.

Figure 10:
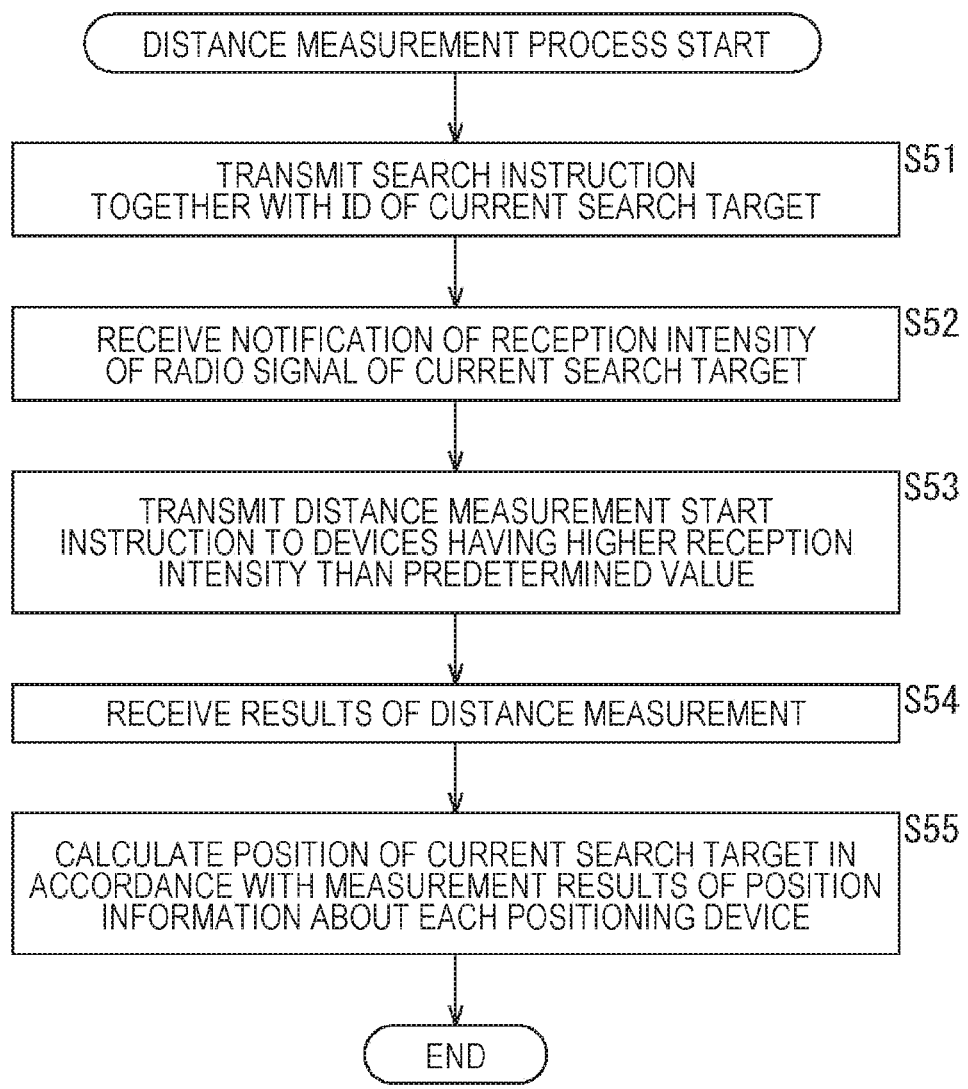
FIG. 10 is a flowchart for explaining a distance measurement process to be performed by a positioning device.

Next, a distance measurement process to be performed by the positioning device 11M is described, with reference to the flowchart shown in FIG. 10. The process shown in FIG. 10 starts in a situation where the positioning device 11M, which is a master device (Master), has acquired the ID of the communication device 12 as the current search target in advance, and the wireless communication control unit 71 has activated the wireless communication unit 31 by designating the ID.

In step 51, the wireless communication control unit 71 of the positioning device 11M causes the wireless communication unit 31 to transmit a current target search instruction together with the ID of the current search target to the positioning devices 11A through 11D, 11F, and 11G within the wireless communication coverage W11M.

Upon receiving the ID of the current search target and the search instruction, the positioning devices 11A through 11D, 11F, and 11G start performing a process basically similar to that shown in FIG. 6. Of the positioning devices 11A through 11D, 11F, and 11G, the positioning devices 11 (specifically, the positioning devices 11A through 11D, and 11G) capable of wirelessly communicating with the communication device 12, which is the current search target, transmits a notification indicating the reception intensity of a radio signal of the current search target, to the positioning device 11M.

In step S52, the wireless communication control unit 71 then causes the wireless communication unit 31 to receive the notification of the reception intensity of a radio signal of the current search target from the positioning devices 11A through 11D, and 11G.

In step S53, the wireless communication control unit 71 causes the wireless communication unit 31 to transmit a distance measurement start instruction to the positioning devices 11 (specifically, the positioning devices 11A, 11B, and 11G located within the distance measurable range R12 of the communication device 12) each having a higher radio signal reception intensity than a predetermined value.

The positioning devices 11 (the positioning devices 11A, 11B, and 11G) instructed to start distance measurement measure the distance to the communication device 12, and transmits the measurement results to the positioning device 11M.

In step S54, the wireless communication control unit 71 then causes the wireless communication unit 31 to receive the results of the distance measurement from the positioning devices 11A, 11B, and 11G.

In step S55, in accordance with the results of the distance measurement from the positioning devices 11A, 11B, and 11G, and the position information about the respective positioning devices 11A, 11B, and 11G, the position calculation unit 72 calculates the position of the communication device 12 as the current search target by triangulation.

Through the above process, the same effects as those of the first embodiment can be achieved, and only the positioning devices 11 capable of measuring the distance to the communication device 12 as the current search target carry out distance measurement. In other words, since the distance measurement units in the positioning devices 11 not capable of carrying out distance measurement are not activated, the entire system can reduce power consumption more reliably.

<Third Embodiment>

Figure 11:
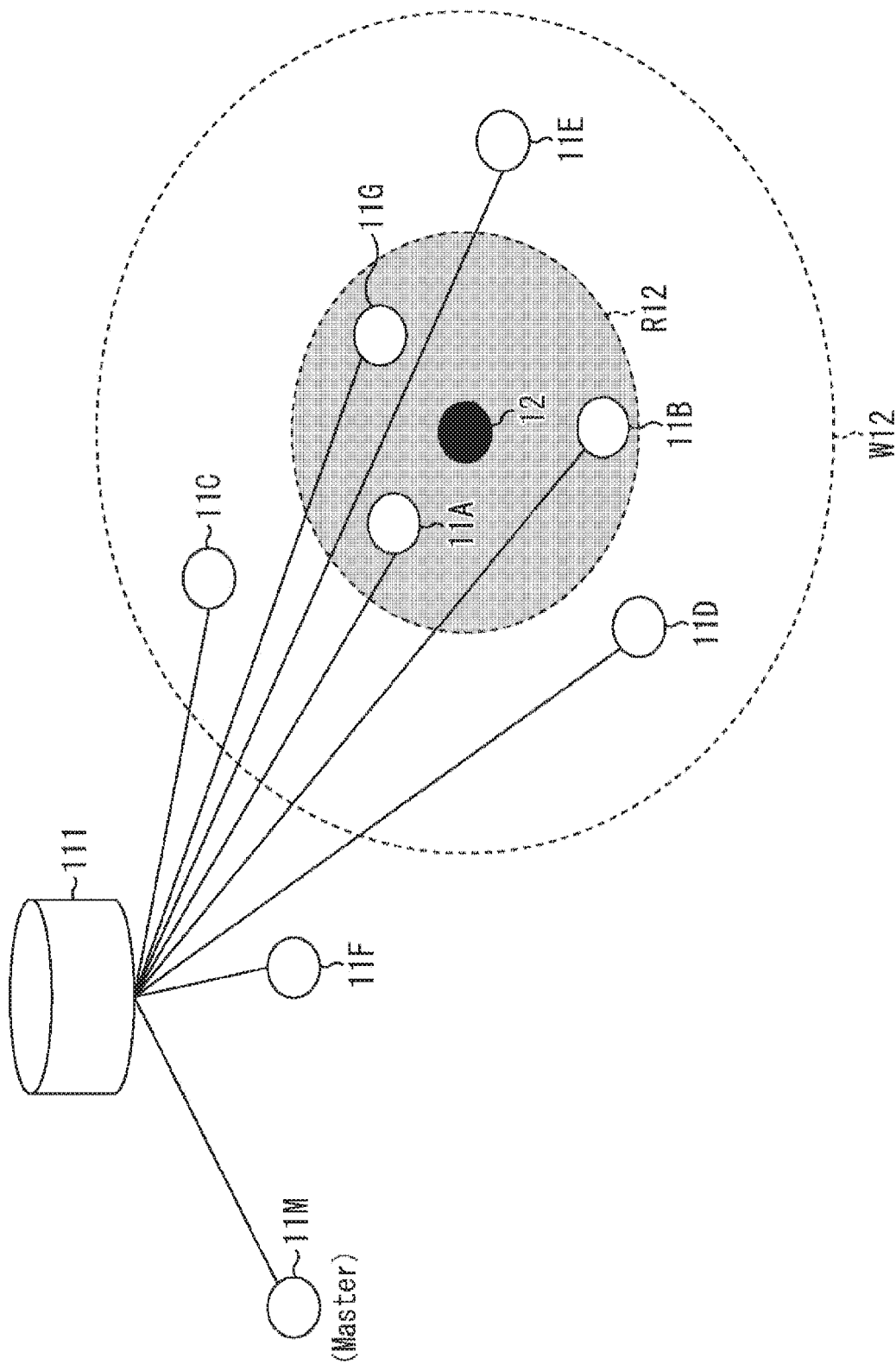
FIG. 11 is a diagram for explaining distance measurement according to a third embodiment.

FIG. 11 is a diagram for explaining distance measurement according to a third embodiment.

In FIG. 11, a positioning device 11M as a master device (Master) is designed as a portable telephone device owned by a user, for example, and positioning devices 11A through 11G that are other master devices are designed as base stations or the like that are installed outside, for example. A communication device 12 that is a slave device is designed as an IC tag or the like to be attached to a baggage (such as an umbrella or a bag) or the like owned by the user, for example. In the example shown in FIG. 11, it is assumed that the user searches for an umbrella or a bag that has been left somewhere, while holding a portable telephone device outdoors.

In FIG. 11, a wireless communication coverage W12 based on the communication device 12 is wider than its distance measurable range R12. It is also assumed that the positioning devices 11A through 11G and 11M, and a server 111 are connected to a wired or wireless network.

For example, the positioning device 11M (the user) instructs the server 111 to search for the communication device 12, via the network. The server 111 instructs the positioning devices 11A through 11G to search for the communication device 12, via the network. The positioning devices 11A, 11B, and 11G located within the distance measurable range R12 of the communication device 12 each measure the distance to the communication device 12. The positioning devices 11A, 11B, and 11G notify the server 111 of the results of the distance measurement, and, in accordance with the reported measurement results, the server 111 calculates the position of the communication device 12. The server 111 then notifies the positioning device 11M of the calculated position of the communication device 12, via the network.

Referring now to FIG. 12, an example configuration of the server 111 is described.

The server 111 includes a communication unit 121, a control unit 122, and a storage unit 123.

Under the control of the control unit 122, the communication unit 121 communicates with the positioning devices 11A through 11G and 11M via a network 130.

The control unit 122 is formed with a CPU, and controls operation of the communication unit 121.

The storage unit 123 stores a control program and the like to be executed by the control unit 122.

The control unit 122 also achieves the configurations of a communication control unit 141 and a position calculation unit 142 by executing the control program stored in the storage unit 123.

The communication control unit 141 realizes communication with the positioning devices 11A through 11G and 11M by controlling the communication unit 121.

In accordance with measurement results supplied from the positioning devices capable of measuring the distance to the communication device 12 among the positioning devices 11A through 11G, the position calculation unit 142 calculates the position of the communication device 12.

Further, the storage unit 123 stores position information 151. The position information 151 is information indicating the positions in which the respective positioning devices 11A through 11G are disposed. That is, the position calculation unit 142 calculates the position of the communication device 12, in accordance with position information about the positioning devices that have measured the distance to the communication device 12, and measurement results supplied from these positioning devices.

It should be noted that, in accordance with an instruction issued to search for the communication device 12 by the positioning device 11M, the server 111 performs a process basically similar to the process described above with reference to FIG. 10.

With the above configuration, the same effects as the those of the first embodiment can be achieved, and a current target search instruction can also be issued to positioning devices 11A through 11G located at remote locations.

It should be noted that, in the third embodiment, the positioning devices 11A through 11G may have a satellite positioning function.

FIG. 13 shows an example configuration of the positioning device 11A having a satellite positioning function. It should be noted that, in FIG. 13, components similar to those in the configuration described above with reference to FIG. 2 are denoted by the same reference numerals as those used in FIG. 2, and explanation of them is not made herein. The configuration of the positioning devices 11B through 11G is also the same as the configuration shown in FIG. 13.

The positioning device 11A includes a wireless communication unit 31, a distance measurement unit 32, a control unit 33, a storage unit 34, a communication unit 171, and a global navigation satellite system (GNSS) positioning unit 172. That is, the positioning device 11A differs from the positioning device 11 shown in FIG. 2 in further including the communication unit 171 and the GNSS positioning unit 172.

Under the control of the control unit 33, the communication unit 171 communicates with the server 111 via the network 130.

The GNSS positioning unit 172 measures its own position by GNSS, and generates position information indicating the position. The generated position information is transmitted to the server 111 via the communication unit 171 and the network 130. The position information transmitted to the server 111 is newly registered in the position information 151 stored in the storage unit 123 of the server 111.

Referring now to the flowchart in FIG. 14, a position information registration process to be performed by the positioning devices 11A through 11G is described.

In step S71, the GNSS positioning unit 172 of each of the positioning devices 11A through 11G (hereinafter simply referred to as the positioning device 11) measures its own position by GNSS, and generates position information indicating the position.

In step S72, the communication unit 171 transmits the position information indicating its own position to the server 111 via the network 130.

Meanwhile, in step S91, the communication unit 121 of the server 111 receives the position information transmitted from the positioning device 11 via the network 130.

In step S92, the communication control unit 141 newly registers the position information received by the communication unit 121, into the position information 151 stored in the storage unit 123.

Through the above process, even the position information about a newly installed positioning device 11 (a base station) can be efficiently registered.

It should be noted that embodiments of the present technology are not limited to the above described embodiments, and various modifications may be made to them without departing from the scope of the present technology.

Further, the present technology may also be embodied in the following exemplary configuration:

A positioning device including:

a communication control unit that controls a communication unit that communicates with a communication device, the communication device transmitting a radio signal including identification information; and a distance measurement control unit that controls a distance measurement unit that carries out measurement of a distance to the communication device, in which, in a case where the identification information included in the radio signal received by the communication unit is the identification information about a current search target, and a reception intensity of the radio signal exceeds a predetermined value, the communication control unit causes the communication unit to transmit a distance measurement start instruction to the communication device, and the distance measurement control unit causes the distance measurement unit to carry out measurement of the distance to the communication device.

B. The positioning device according to A, in which, in a case where the measurement of the distance to the communication device has been completed, the communication control unit causes the communication unit to transmit a distance measurement end instruction to the communication device, and the distance measurement control unit causes the distance measurement unit to end the measurement of the distance to the communication device.

C. The positioning device according to A or B, in which, after a predetermined time has passed since a start of the measurement of the distance to the communication device, the distance measurement control unit causes the distance measurement unit to end the measurement of the distance to the communication device.

D. The positioning device according to any of A to C, in which, in a case where the reception intensity of the radio signal becomes lower than the predetermined value after a start of the measurement of the distance to the communication device, the communication control unit causes the communication unit to transmit a distance measurement end instruction to the communication device, and the distance measurement control unit causes the distance measurement unit to end the measurement of the distance to the communication device.

E. The positioning device according to any of C to D, in which the predetermined value is the reception intensity indicating a range in which the distance measurement unit is able to carry out the measurement of the distance to the communication device.

F. The positioning device according to any of A to E, in which the distance measurement control unit adjusts a width of a range in which the distance measurement unit is able to carry out the measurement of the distance to the communication device.

G. The positioning device according to any of A to F, in which the distance measurement control unit controls timing of signal output from the distance measurement unit.

H. The positioning device according to any of A to G, in which the distance measurement unit carries out distance measurement by ultrawideband (UWB) communication.

I. The positioning device according to any of A to G, in which the distance measurement unit carries out distance measurement, using light emission from a light emitter.

J. The positioning device according to any of A to G, in which the distance measurement unit carries out distance measurement, using sound waves.

K. A communication device including:

a communication control unit that controls a communication unit that transmits a radio signal to a positioning device, the radio signal including identification information; and a distance measurement control unit that controls a distance measurement unit that carries out measurement of a distance to the positioning device, in which, in a case where the communication control unit has determined that the communication unit has received a distance measurement start instruction from the positioning device, the distance measurement control unit causes the distance measurement unit to carry out measurement of the distance to the positioning device.

L. The communication device according to K, in which, in a case where the communication control unit has determined that the communication unit has received a distance measurement end instruction from the positioning device, the distance measurement control unit causes the distance measurement unit to end the measurement of the distance to the positioning device.

M. The communication device according to K or L, in which, after a predetermined time has passed since a start of the measurement of the distance to the positioning device, the distance measurement control unit causes the distance measurement unit to end the measurement of the distance to the positioning device.

N. The communication device according to any of K to M, in which the distance measurement control unit adjusts a width of a range in which the distance measurement unit is able to carry out the measurement of the distance to the positioning device.

O. The communication device according to any of K to N, in which the distance measurement control unit controls timing of signal output from the distance measurement unit.

P. The communication device according to any of K to O, in which the distance measurement unit carries out distance measurement by ultrawideband (UWB) communication.

Q. The communication device according to any of K to O, in which the distance measurement unit carries out distance measurement, using light emission from a light emitter.

R. The communication device according to any of K to O, in which the distance measurement unit carries out distance measurement, using sound waves.

S. A positioning system including:

a positioning device including:
   a first communication control unit that controls a first communication unit that communicates with a communication device, the communication device transmitting a radio signal including identification information; and
a first distance measurement control unit that controls a first distance measurement unit that carries out measurement of a distance to the communication device; and
a communication device including:
   a second communication control unit that controls a second communication unit that transmits a radio signal to the positioning device, the radio signal including the identification information; and a second distance measurement control unit that controls a second distance measurement unit that carries out measurement of a distance to the positioning device, in which, in a case where the identification information included in the radio signal received by the first communication unit is the identification information about a current search target, and a reception intensity of the radio signal exceeds a predetermined value, the first communication control unit causes the first communication unit to transmit a distance measurement start instruction to the communication device, and the first distance measurement control unit causes the first distance measurement unit to carry out measurement of the distance to the communication device, and in a case where the second communication control unit has determined that the second communication unit has received a distance measurement start instruction from the positioning device, the second distance measurement control unit causes the second distance measurement unit to carry out measurement of the distance to the positioning device.

REFERENCE SIGNS LIST

10 Positioning system
11, 11A through 11G, 11M Positioning device
12 Communication device
31 Wireless communication unit
32 Distance measurement unit
33 Control unit
34 Storage unit
41 Wireless communication control unit
42 Distance measurement control unit
51 Wireless communication unit
52 Distance measurement unit
53 Control unit
54 Storage unit
61 Wireless communication control unit
62 Distance measurement control unit
71 Wireless communication control unit
72 Position calculation unit
81 Position information
111 Server
121 Communication unit
122 Control unit
123 Storage unit
141 Communication control unit
142 Position calculation unit
151 Position information
171 Communication unit
172 GNSS positioning unit

What is claimed is:

1. A positioning device comprising:
a communication control unit configured to control a communication unit to communicate with a communication device, wherein the communication device transmits a radio signal including identification information; and
a distance measurement control unit configured to control a distance measurement unit to carry out measurement of a distance to the communication device,
wherein,
in a case where the identification information included in the radio signal received by the communication unit is the identification information about a current search target, and a reception intensity of the radio signal exceeds a predetermined value,
the communication control unit is further configured to cause the communication unit to transmit a distance measurement start instruction to the communication device, and
the distance measurement control unit is further configured to cause the distance measurement unit to carry out the measurement of the distance to the communication device.

2. The positioning device according to claim 1, wherein, in a case where the measurement of the distance to the communication device has been completed,
the communication control unit is further configured to cause the communication unit to transmit a distance measurement end instruction to the communication device, and
the distance measurement control unit is further configured to cause the distance measurement unit to end the measurement of the distance to the communication device.

3. The positioning device according to claim 1, wherein, after a predetermined time has passed since a start of the measurement of the distance to the communication device, the distance measurement control unit is further configured to cause the distance measurement unit to end the measurement of the distance to the communication device.

4. The positioning device according to claim 1, wherein, in a case where the reception intensity of the radio signal becomes lower than the predetermined value after a start of the measurement of the distance to the communication device,
the communication control unit is further configured to cause the communication unit to transmit a distance measurement end instruction to the communication device, and
the distance measurement control unit is further configured to cause the distance measurement unit to end the measurement of the distance to the communication device.

5. The positioning device according to claim 1, wherein the predetermined value is the reception intensity indicating a range in which the distance measurement unit is able to carry out the measurement of the distance to the communication device.

6. The positioning device according to claim 1, wherein the distance measurement control unit is further configured to adjust a width of a range in which the distance measurement unit is able to carry out the measurement of the distance to the communication device.

7. The positioning device according to claim 1, wherein the distance measurement control unit is further configured to control timing of signal output from the distance measurement unit.

8. The positioning device according to claim 1, wherein the distance measurement unit carries out distance measurement by ultrawideband (UWB) communication.

9. The positioning device according to claim 1, wherein the distance measurement unit carries out distance measurement, using light emission from a light emitter.

10. The positioning device according to claim 1, wherein the distance measurement unit carries out distance measurement, using sound waves.

11. A communication device, comprising:
- a communication control unit configured to control a communication unit to transmit a radio signal to a positioning device, the radio signal including identification information; and
- a distance measurement control unit configured to control a distance measurement unit to carry out measurement of a distance to the positioning device, wherein,
in a case where the communication control unit has determined that the communication unit has received a distance measurement start instruction from the positioning device,
the distance measurement control unit is further configured to cause the distance measurement unit to carry out the measurement of the distance to the positioning device.

12. The communication device according to claim 11, wherein,
in a case where the communication control unit has determined that the communication unit has received a distance measurement end instruction from the positioning device,
the distance measurement control unit is further configured to cause the distance measurement unit to end the measurement of the distance to the positioning device.

13. The communication device according to claim 11, wherein,
after a predetermined time has passed since a start of the measurement of the distance to the positioning device, the distance measurement control unit is further configured to cause the distance measurement unit to end the measurement of the distance to the positioning device.

14. The communication device according to claim 11, wherein the distance measurement control unit is further configured to adjust a width of a range in which the distance measurement unit is able to carry out the measurement of the distance to the positioning device.

15. The communication device according to claim 11, wherein the distance measurement control unit is further configured to control timing of signal output from the distance measurement unit.

16. The communication device according to claim 11, wherein the distance measurement unit carries out distance measurement by ultrawideband (UWB) communication.

17. The communication device according to claim 11, wherein the distance measurement unit carries out distance measurement, using light emission from a light emitter.

18. The communication device according to claim 11, wherein the distance measurement unit carries out distance measurement, using sound waves.

19. A positioning system comprising:
- a positioning device including:
  - a first communication control unit configured to control a first communication unit to communicates with a communication device, wherein the communication device transmits a radio signal including identification information; and
  - a first distance measurement control unit configured to control a first distance measurement unit to carry out measurement of a distance to the communication device; and
- a communication device including:
  - a second communication control unit configured to control a second communication unit to transmit a radio signal to the positioning device, the radio signal including the identification information; and
  - a second distance measurement control configured to control a second distance measurement unit to carry out measurement of a distance to the positioning device, wherein,
in a case where the identification information included in the radio signal received by the first communication unit is the identification information about a current search target, and a reception intensity of the radio signal exceeds a predetermined value,
the first communication control unit is further configured to cause the first communication unit to transmit a distance measurement start instruction to the communication device, and
the first distance measurement control unit is further configured to cause the first distance measurement unit to carry out the measurement of the distance to the communication device, and
in a case where the second communication control unit has determined that the second communication unit has received a distance measurement start instruction from the positioning device,
the second distance measurement control unit is further configured to cause the second distance measurement unit to carry out the measurement of the distance to the positioning device.

* * * * *